(12) United States Patent
Royer et al.

(10) Patent No.: US 10,598,864 B2
(45) Date of Patent: Mar. 24, 2020

(54) FERRULE-LESS OPTICAL FIBER SIGNAL DETECTION BY AN OPTICAL DETECTOR MOUNTED WITHIN THE HOUSING RECEIVES THE OPTICAL FIBER

(71) Applicant: CommScope Technologies LLC, Hickory, NC (US)

(72) Inventors: Tyler John Royer, York, PA (US); Michael Lawrence Gurreri, York, PA (US); Michael Ward Zitsch, Carlisle, PA (US); Michael Aaron Kadar-Kallen, Harrisburg, PA (US); Randall Bobby Paul, Elizabethville, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 105 days.

(21) Appl. No.: 15/993,750

(22) Filed: May 31, 2018

(65) Prior Publication Data
US 2018/0348443 A1    Dec. 6, 2018

Related U.S. Application Data

(60) Provisional application No. 62/512,955, filed on May 31, 2017.

(51) Int. Cl.
| | |
|---|---|
| *G02B 6/42* | (2006.01) |
| *G02B 6/38* | (2006.01) |
| *G01J 1/04* | (2006.01) |

(52) U.S. Cl.
CPC .......... *G02B 6/3809* (2013.01); *G01J 1/0425* (2013.01); *G02B 6/424* (2013.01);
(Continued)

(58) Field of Classification Search
CPC ..... G01J 1/0425; G02B 6/3809; G02B 6/424; G02B 6/4202; G02B 6/4251; G02B 6/4256
(Continued)

(56) References Cited

U.S. PATENT DOCUMENTS

| | | |
|---|---|---|
| 4,881,789 A | 11/1989 | Levinson |
| 4,941,724 A | 7/1990 | Couden et al. |

(Continued)

FOREIGN PATENT DOCUMENTS

| | | |
|---|---|---|
| JP | 2005-208239 | 8/2005 |
| WO | WO2012112344 | 8/2012 |

(Continued)

OTHER PUBLICATIONS

Wikipedia, "Fresnel equations," retrieved from the Internet: <URL: https://en.wikipedia.org/wiki/Fresnel_equations>, last modified Nov. 15, 2016, 5 pages.

*Primary Examiner* — Que Tan Le
(74) *Attorney, Agent, or Firm* — Merchant & Gould P.C.

(57) ABSTRACT

Aspects of the present disclosure relate to detecting an optical signal and/or optical power in a ferrule-less optical fiber. In certain embodiments, one or more optical detectors are incorporated into an adapter that is configured to interface with a connectorized or non-connectorized ferrule-less optical fiber. The optical detector detects the presence or absence, and/or the optical power level, of the optical signal being transmitted through ferrule-less optical fiber and produces an electrical output representative of the detected optical signal.

21 Claims, 9 Drawing Sheets

(52) U.S. Cl.
CPC ......... *G02B 6/4214* (2013.01); *G02B 6/4286* (2013.01); *G02B 6/3825* (2013.01); *G02B 6/3895* (2013.01); *G02B 6/429* (2013.01)

(58) Field of Classification Search
USPC ............................................ 250/227.14, 239
See application file for complete search history.

(56) References Cited

U.S. PATENT DOCUMENTS

| | | | |
|---|---|---|---|
| 5,963,695 A * | 10/1999 | Joyce | G02B 6/4236 385/88 |
| 6,612,751 B1 | 9/2003 | Watanabe et al. | |
| 8,870,466 B2 | 10/2014 | Lu | |
| 9,497,016 B2 | 11/2016 | Suzuki et al. | |
| 2010/0329604 A1 | 12/2010 | Kojima et al. | |

FOREIGN PATENT DOCUMENTS

| | | |
|---|---|---|
| WO | WO2013117598 | 8/2013 |
| WO | WO2014099457 | 6/2014 |
| WO | WO2017223072 | 12/2017 |
| WO | WO2017223461 | 12/2017 |
| WO | WO2018017883 | 1/2018 |

\* cited by examiner

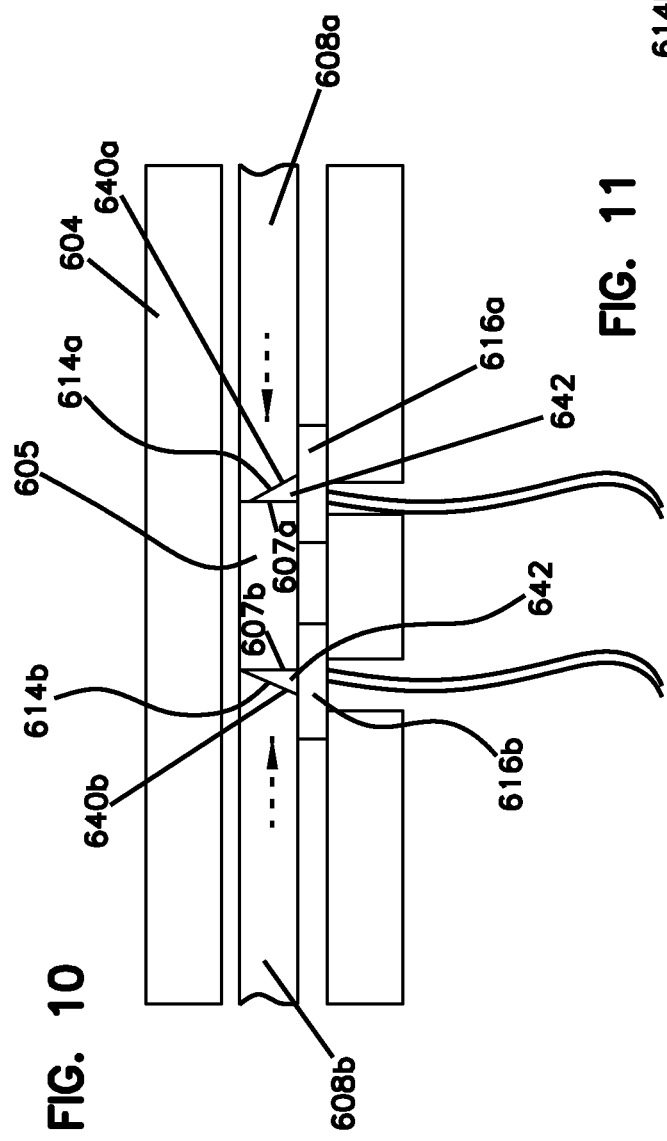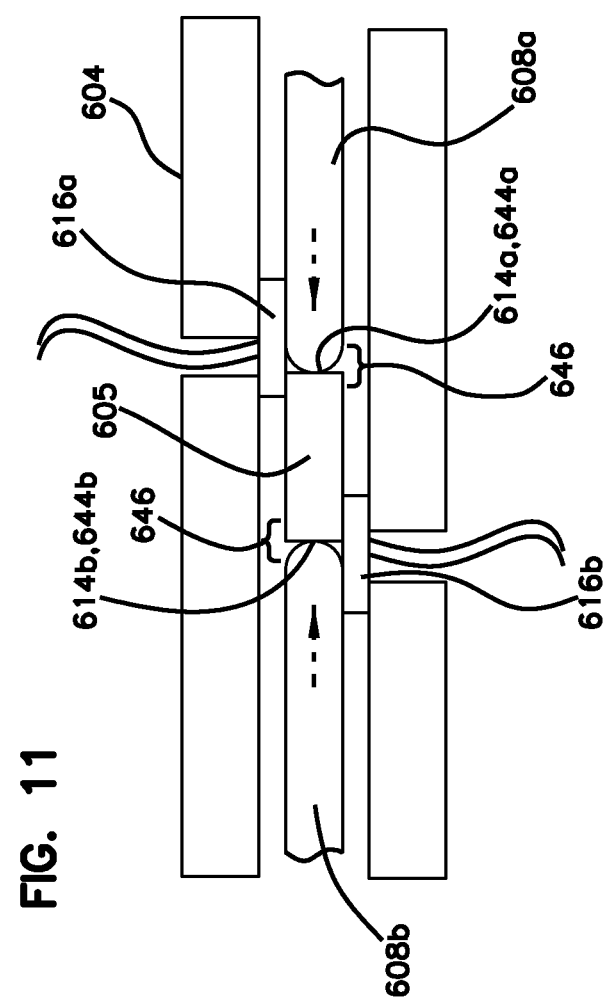

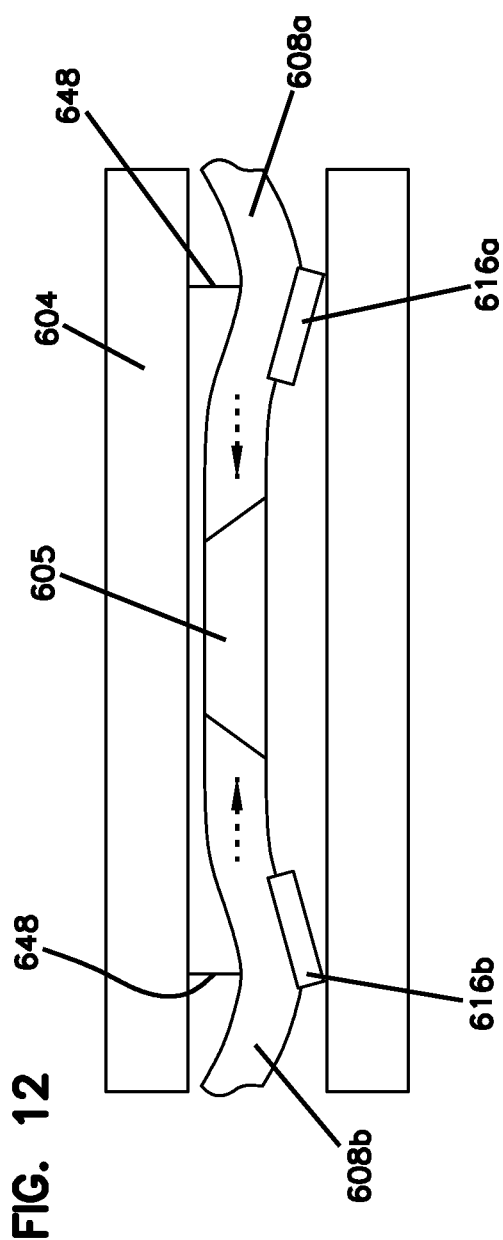
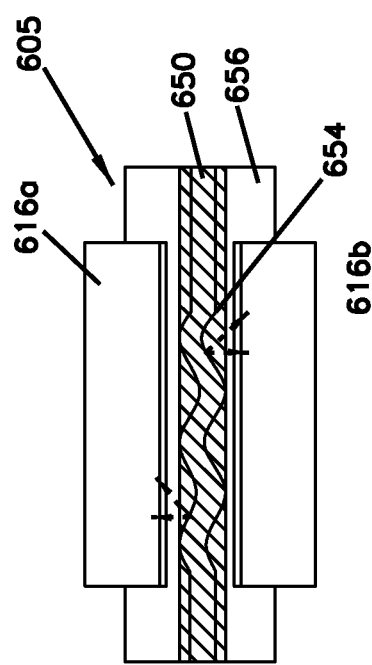
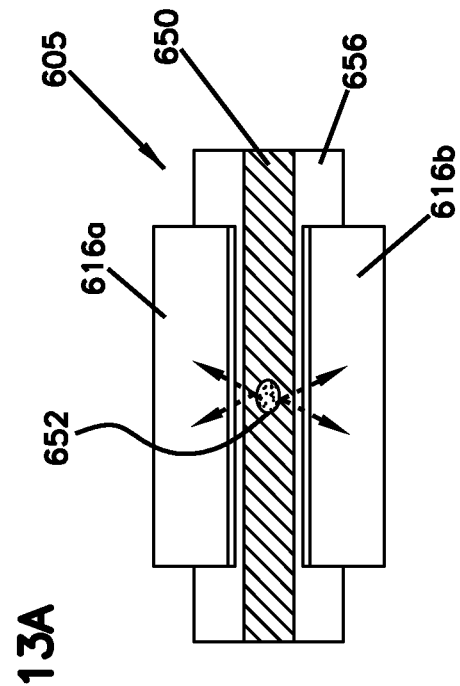

_FERRULE-LESS OPTICAL FIBER SIGNAL DETECTION BY AN OPTICAL DETECTOR MOUNTED WITHIN THE HOUSING RECEIVES THE OPTICAL FIBER_

CROSS-REFERENCE TO RELATED APPLICATIONS

This application claims the benefit of U.S. Provisional Patent Application No. 62/512,955, filed May 31, 2017, entitled, "FERRULE-LESS OPTICAL FIBER SIGNAL DETECTION." The disclosure of this priority application is hereby incorporated by reference in its entirety into the present application.

TECHNICAL FIELD

The present disclosure relates generally to signal detection and, more particularly, to optical signal detection in ferrule-less optical fibers.

BACKGROUND

Fiber optic communication system are becoming more prevalent due to their ability transmit large volumes of data and voice signals over relatively long distances in a short amount of time. To ensure successful transmission of signals over optical fibers it is necessary to be able to monitor or assess the operability of a specific fiber within the system. Optical detectors can provide this monitoring or assessing function. Optical detectors can be placed in a position proximate an optical fiber such that light transmitted through an optical fiber can be detected by the optical detector. Light incident on the optical detector is converted into an electrical signal that is representative of the operability of the fiber or of the power level of the optical transmission. Fiber optic communication systems are typically facilitated through the use of standardized SC or LC connectors, which are plugs having a protruding ferrule that holds and aligns an optical fiber. Today's optical detectors are configured to interface only with these ferruled optical fibers and their respective connectors.

SUMMARY

Various embodiments of systems and methods for detecting an optical signal and/or optical power in a ferrule-less optical fiber are disclosed herein. In certain embodiments, the system and/or method includes an adapter incorporating one or more optical detectors that are configured to detect light escaping from one or more ferrule-less optical fibers. In certain embodiments, the adapter is configured to interface with at least two ferrule-less optical fibers, and to detect an optical signal and/or optical power in one or both of the ferrule-less optical fibers. In certain embodiments, the adapter is configured to optically couple at least two ferrule-less optical fibers. In certain embodiments, the adapter interfaces with a connector of a connectorized ferrule-less optical fiber while in other embodiments the adapter interfaces with a non-connectorized ferrule-less optical fiber.

In certain embodiments, the optical detector detects light escaping a ferrule-less optical fiber from a tip of the optical fiber, detects light from a location on the ferrule-less optical fiber where a portion of the cladding has been removed, and/or detects light from a location on the ferrule-less optical fiber where a portion of the core and/or cladding of the fiber has been modified to direct light towards the optical detector. Optical fiber modification can include incorporating into the ferrule-less optical fiber one or more light directing features such as a lens, a mirror, a prism, a grating, a notch, a bend and/or a distortion point. In certain embodiments, the space about the ferrule-less optical fiber within the adapter housing includes a lens, a mirror, a prism, and/or a refractive medium to help direct light from the ferrule-less optical fiber to the optical detector.

In certain embodiments, the optical detector detects light escaping a ferrule-less optical fiber at the interface of two ferrule-less optical fiber tips. In certain embodiments, a first optical detector detects light escaping from a first ferrule-less optical fiber and a second optical detector detects light escaping from a second ferrule-less optical fiber. In certain embodiments, a single optical detector detects light escaping from two or more ferrule-less optical fibers.

In certain embodiments, systems and methods for detecting light and/or optical power in a ferrule-less optical fiber include an adapter incorporating an independent bare fiber portion of optical fiber that interfaces with the ferrule-less optical fiber; the independent bare fiber portion is configured to direct an optical signal received from the ferrule-less optical fiber to the optical detector. In certain embodiments, the independent bare fiber portion is configured to collimate (and/or de-collimate) the optical signal received from the ferrule-less optical fiber. In certain embodiments, a collimating (or de-collimating) lens positioned proximate the independent bare fiber portion collimates (or de-collimate) the optical signal.

In certain embodiments, the optical detector detects light from the optical signal received by the independent bare fiber portion from a location on the independent bare fiber portion where a portion of the cladding has been removed and/or from a location on the independent bare fiber portion where the core and/or cladding has been modified to direct light towards the optical detector. Bare fiber portion modifications can include incorporating into the independent bare fiber portion one or more light directing features such as a lens, a mirror, a prism, a grating, a notch, a bend and/or a distortion point. In certain embodiments, the space about the bare fiber portion within the adapter housing includes a lens, a mirror, a prism, and/or a refractive medium to help direct light from the bare fiber portion to the optical detector.

In certain embodiments, the independent bare fiber portion interfaces with at least two ferrule-less optical fibers. In certain embodiments, the independent bare fiber portion directs light transmitted by a first ferrule-less optical fiber to a first optical detector and directs light transmitted by a second ferrule-less optical fiber to a second optical detector. In certain embodiments, the independent bare fiber portion directs light transmitted by first and second ferrule-less optical fibers to a single optical detector. In certain embodiments, the independent bare fiber portion is of a unitary configuration while in other embodiments the independent bare fiber portion comprises two or more lengths of optical fiber that can be of the same or differing lengths. In the instance of two or more lengths, the lengths can be adhered, fused or otherwise bonded together.

In certain embodiments, the independent bare fiber portion is replaced with one or more gradient index (GRIN) lenses. The GRIN lenses are configured to interface with one or more ferrule-less optical fibers and direct a portion of the optical signal transmitted through the ferrule-less optical fiber to the one or more optical detectors. In certain embodiments, the adapter includes at least two GRIN lenses wherein each of the GRIN lenses interfaces with a respective ferrule-less optical fiber and each of the GRIN lenses directs light transmitted by their respective ferrule-less optical fibers to an optical detector. In certain embodiments, the at least two GRIN lenses are adhered, fused or otherwise bonded together.

An aspect of the present disclosure is directed to an optical signal detection system that includes a housing and an optical detector. The housing has first and second ends with at least the first end configured to receive a ferrule-less optical fiber. The optical detector is mounted within the housing and detects at least a portion of an optical signal transmitted through the ferrule-less optical fiber. The optical detector generates an output representative of the detected optical signal.

Another aspect of the present disclosure is directed to an optical signal detection system that includes a housing, a first optical detector, and a second optical detector. The housing includes first and second ends, each of which are configured to receive first and second ferrule-less optical fibers, respectively. The first optical detector is mounted within the housing and detects at least a portion of an optical signal transmitted through the first ferrule-less optical fiber. The second optical detector is mounted within the housing and detects at least a portion of an optical signal transmitted through the second ferrule-less optical fiber. Each of the first and second optical detectors generates an output representative of their respective detected optical signals.

Another aspect of the present disclosure is directed to method of detecting an optical signal. The method includes: receiving into a housing first and second ferrule-less optical fibers; directing at least a portion of a first optical signal transmitted through the first ferrule-less optical fiber to a first optical detector and directing at least a portion of a second optical signal to a second optical detector, the first and second optical detectors mounted within the housing; detecting with the first and second optical detectors the optical signal directed towards the respective first and second optical detectors; and generating with each of the first and second optical detectors an output representative of the optical signal detected by the first and second optical detectors, respectively.

DESCRIPTION OF THE DRAWINGS

FIG. 10 is a cross-sectional view of an example of a ferrule-less optical fiber detection system illustrating an alignment sleeve of an adapter.

FIG. 11 is a cross-sectional view of an example of a ferrule-less optical fiber detection system illustrating an alignment sleeve of an adapter.

FIG. 12 is a cross-sectional view of an example of a ferrule-less optical fiber detection system illustrating an alignment sleeve of an adapter.

FIGS. 13A and 13B cross-sectional views of examples of bare fiber portions.

DETAILED DESCRIPTION

Aspects of the present disclosure relate to detecting an optical signal and/or optical power in a ferrule-less optical fiber. In certain embodiments, one or more optical detectors are incorporated into an adapter that is configured to interface with a connectorized or non-connectorized ferrule-less optical fiber. The optical detector detects the presence/absence and/or the optical power level of the optical signal being transmitted through ferrule-less optical fiber and produces an electrical output representative of the detected optical signal.

Figure 1:
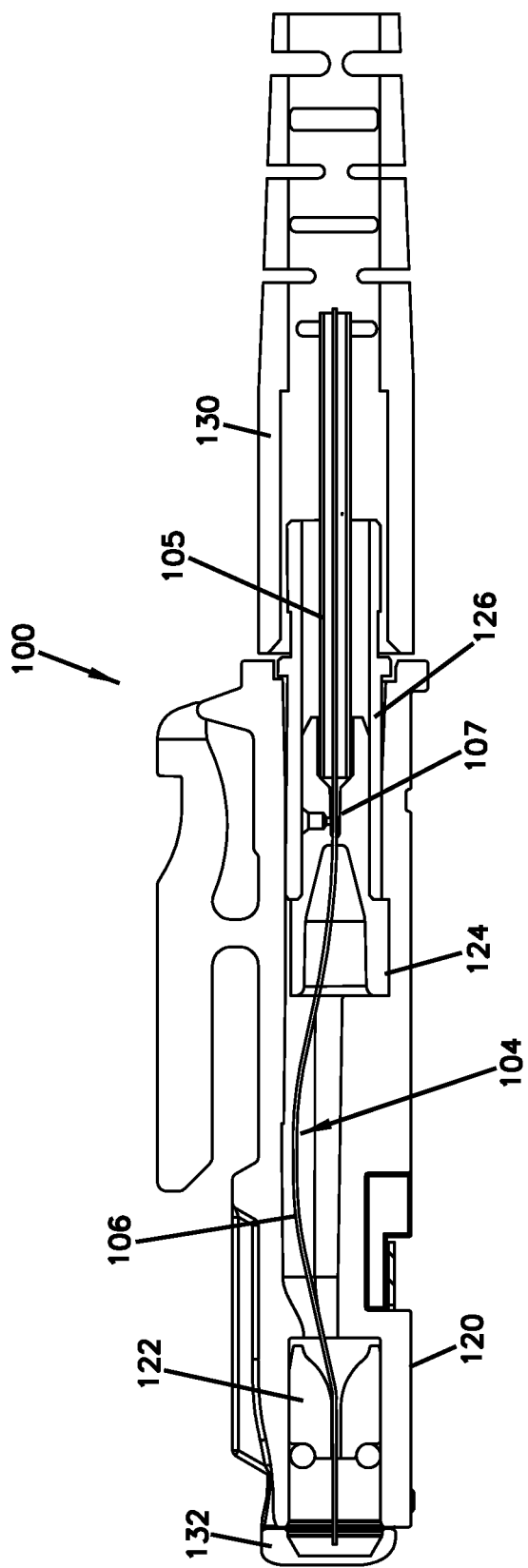
FIG. 1 is a cross-sectional view of an example of a ferrule-less optical fiber and connector.

An example of a ferrule-less connector 100 and a ferrule-less optical fiber 104 extending there through is illustrated in FIG. 1; the ferrule-less optical fiber 104 extends from a fiber optic cable 105. In certain embodiments, the ferrule-less optical fiber 104 includes a bare fiber section 106, e.g. a section of optical fiber comprising only a glass core and a glass cladding layer, and a coated section 107, e.g., a section of fiber comprising the core, the cladding, a coating layer and a buffer layer. The ferrule-less connector 110 comprises a main connector body 120, a fiber positioning piece 122, a fiber fixation component 124, and a proximal connector body 126. The ferrule-less connector 110 can additionally include various other components such as a boot 130 and a shutter 132. The ferrule-less connector 100, while illustrated with a single ferrule-less optical fiber, can also be configured to accommodate a plurality of ferrule-less optical fibers.

Additional information regarding the ferrule-less connector 100 and the ferrule-less optical fiber 104 can be found in U.S. provisional patent application No. 62/352,281, filed Jun. 20, 2016 and entitled "Ferrule-less Fiber Optic Connector." Further information can be found in U.S. provisional patent application No. 62/383,696, filed Sep. 6, 2016 and entitled "Ferrule-Less Fiber Optic Connector Having Multiple Optical Fibers," PCT Publication No. WO 2012/112344, PCT Publication No. WO 2013/117598 and U.S. Pat. No. 8,870,466. The entire contents of each of the identified provisional applications, non-provisional applications, PCT applications and patents is hereby incorporated by reference.

Many of the optical fiber signal detection systems and methods described herein are configured to interface with ferrule-less optical fiber and connector described above. However, it should be noted that each of the systems and methods can be modified to accommodate a different type of ferrule-less connector and can also be modified to accommodate non-connectorized ferrule-less optical fibers.

Figure 2:
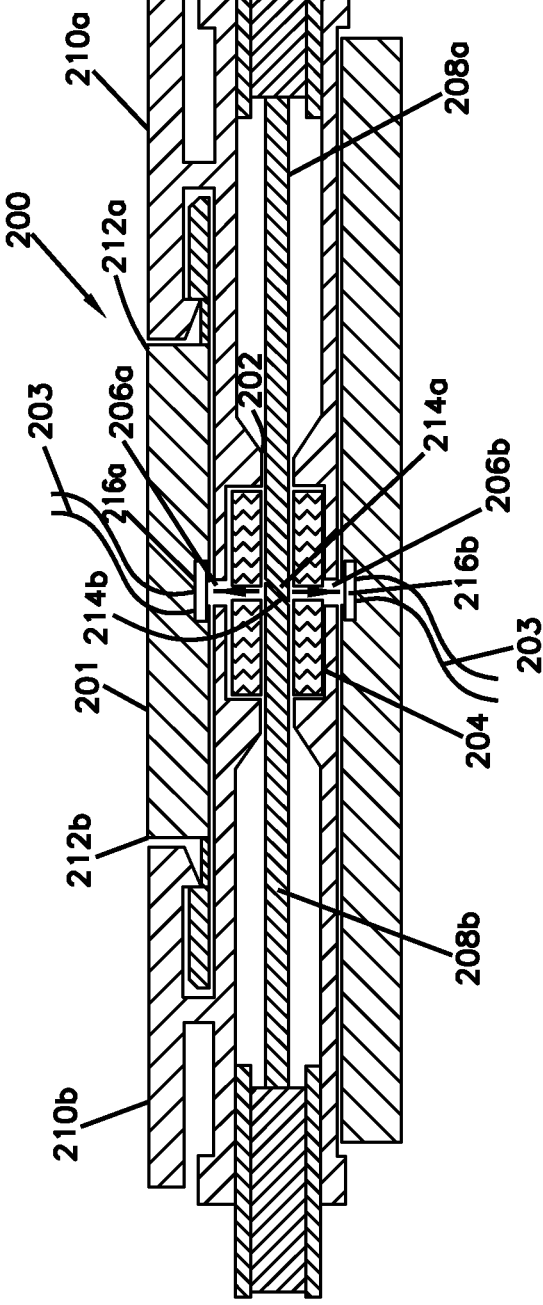
FIG. 2 is a cross-sectional view of an example of a ferrule-less optical fiber detection system utilizing an adapter.

A first example embodiment of a ferrule-less optical fiber signal detection system is illustrated in FIG. 2. In this embodiment the system includes an adapter 200. The adapter 200 includes an adapter body housing 201 that is configured with an alignment structure 202 having an alignment sleeve 204. The adapter body housing 201 additionally includes one or more light detection channels, e.g. channels 206a, 206b which are perpendicular to the axial direction of the alignment sleeve 204. The alignment sleeve 204 receives a first ferrule-less optical fiber 208a extending from a first connector 210a and a second ferrule-less optical fiber 208b extending from a second connector 210b.

First and second ends, 212a and 212b, of the adapter body housing 201 are configured to interface with the first and second connectors 210a, 210b such that a tip 214a, 214b of each of the ferrule-less optical fibers 208a, 208b is positioned at a desired location within the adapter 200; in this instance, a central location. The tips 214a, 214b are configured to abut one another (e.g. when angled at complementary angles or in a butt joint configuration) at a location proximate the light detection channels 206a, 206b such that any leakage light from one or both of the ferrule-less optical fibers 208a, 208b travels through the one or more light detection channels 206a, 206b.

An optical detector (e.g. semiconductor detector, photodetector, photodiode, PIN diode, etc.) 216a, 216b is positioned at the end of each light detection channel 206a, 206b to detect the light and provide an output representative of the detected light and/or power of the detected light. The optical detectors 216a, 216b can be mounted in any location proximate to or on the ferrule-less optical fibers 208a, 208b and/or can be fixedly or removably mounted on or within the adapter body housing 201. The optical detectors 216a, 216b can be powered internally, e.g. with a battery, or coupled via conductors 203 to an external power source. Optical signal readings from the optical detectors 216a, 216b can be transmitted via wired or wireless transmission. It should be noted that in certain embodiments the light detection channels can be omitted from the adapter body housing 201 to provide a continuous, uninterrupted adapter body housing.

In certain embodiments, a refractive oil, gel, adhesive, liquid, or other flowable medium coats the alignment sleeve 204 and/or the one or more light detection channels 206a, 206b, to assist in transmission of any light escaping the ferrule-less optical fibers 208a, 208b through the light detection channels 206a, 206b to the one or more optical detectors 216a, 216b. In certain embodiments, the refractive medium has a refractive index of 1.5 or higher. In certain embodiments, a high refractive index film or coating is provided on the angled (or non-angled) tips 214a, 214b of the ferrule-less optical fibers 208a, 208b (or elsewhere on the ferrule-less optical fibers 208a, 208b) to assist in light transmission to the optical detectors 216a, 216b. In certain embodiments, the alignment structure 202 itself is fabricated from a high refractive index material to assist in light transmission to the optical detectors 216a, 216b.

Figure 3:
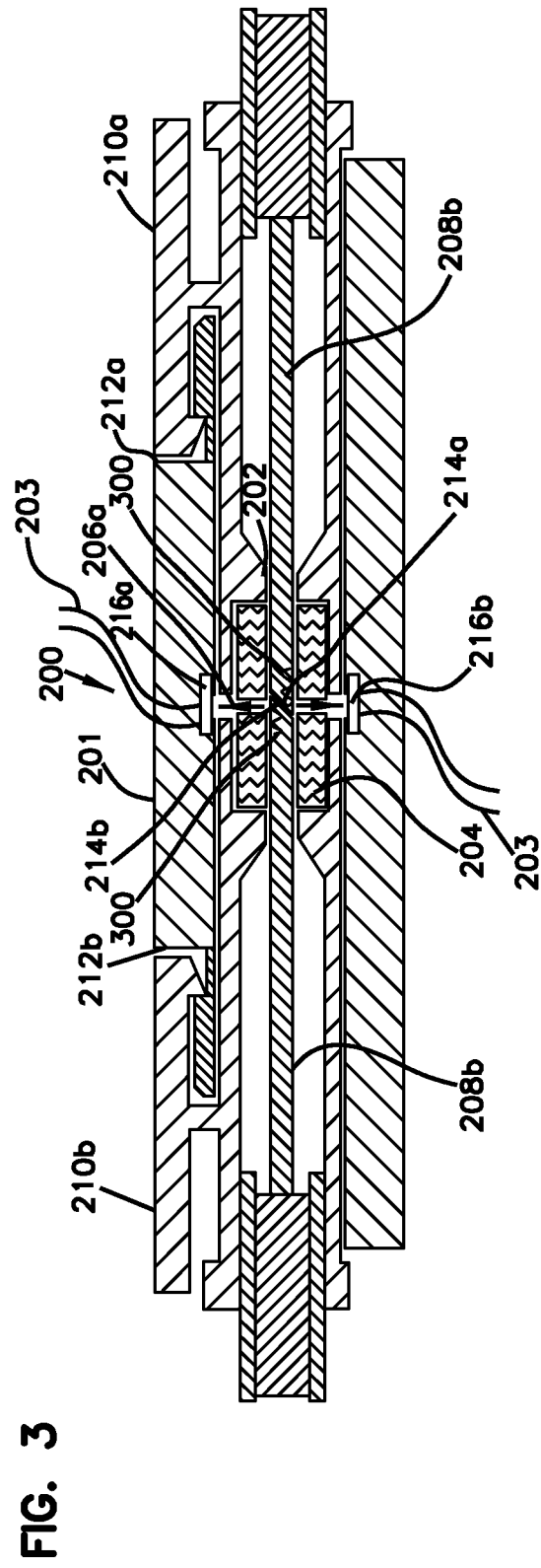
FIG. 3 is a cross-sectional view of an example of a ferrule-less optical fiber detection system utilizing an adapter.

In the example embodiment of FIG. 3, gratings or undulations 300 on one or both of the ferrule-less optical fibers 208a, 208b help to direct light to the detectors 216a, 216b; the grating and/or undulation can be formed in the cladding of the ferrule-less optical fibers 208a, 208b, in the core of the ferrule-less optical fibers 208a, 208b, or in both the cladding and core of the ferrule-less optical fibers 208a, 208b. In certain embodiments, the undulations are formed by a micro-bend in the core and/or cladding of the ferrule-less optical fibers 208a, 208b to generate the leakage light that can be directed to the detectors 216a, 216b. In certain embodiments, the micro-bend is formed by irradiating the optical fibers with a laser at or near the tip 214a, 214b of the ferrule-less optical fibers 208a, 208b. In certain embodiments, one or more bubbles formed in the core and/or cladding at or near the tip provide flexibility to the ferrule-less optical fibers 208a, 208b, to enable a micro-bend in the fiber.

Figure 4:
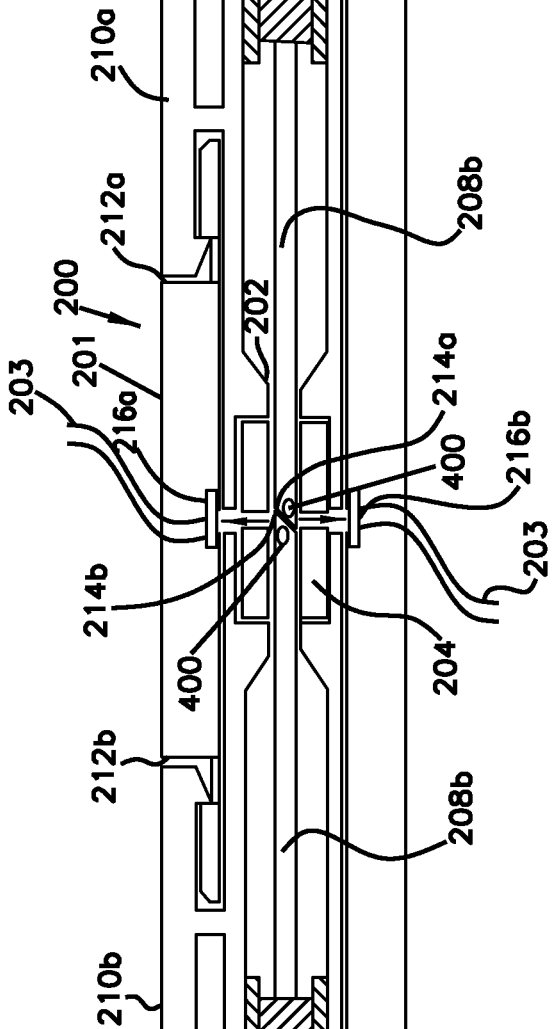
FIG. 4 is a cross-sectional view of an example of a ferrule-less optical fiber detection system utilizing an adapter.

In the example embodiment of FIG. 4, a distortion point 400 formed in the core and/or cladding can also be used to help direct lost light to the detectors 216a, 216b. In certain embodiments, the distortion point 400 is formed by irradiating the ferrule-less optical fibers 208a, 208b at or near the tips of the optical fibers. In certain embodiments, the irradiation operates to thermally diffuse a dopant within the core and/or cladding causing the mode field diameter of the irradiated portion to enlarge and partially distort to direct light to the detectors 216a, 216b.

Figure 5:
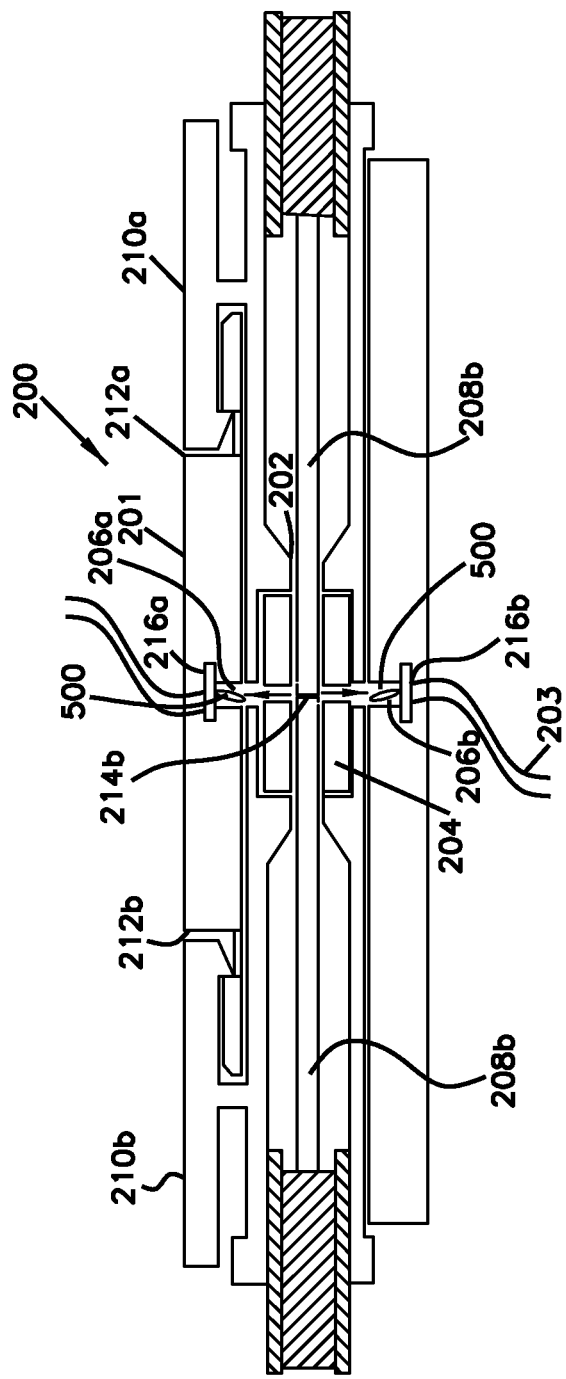
FIG. 5 is a cross-sectional view of an example of a ferrule-less optical fiber detection system utilizing an adapter.

In the example embodiment of FIG. 5, one or more mirrors or lenses 500 are provided within the one or more light detection channels 206a, 206b to help focus any light escaping the ferrule-less optical fibers 208a, 208b onto the detectors 216a, 216b. In certain embodiments, the alignment sleeve 204 is of a transparent material enabling light escaping the ferrule-less optical fibers 204a, 204b to transmit through the alignment sleeve 204 to the detectors 216a, 216b. In certain embodiments, the transparent alignment sleeve 204 includes one or more of: a lens, mirror, grating, prism, bend, notch, distortion point, or other feature that can assist in directing light onto the detectors 216a, 216b.

Figure 6:
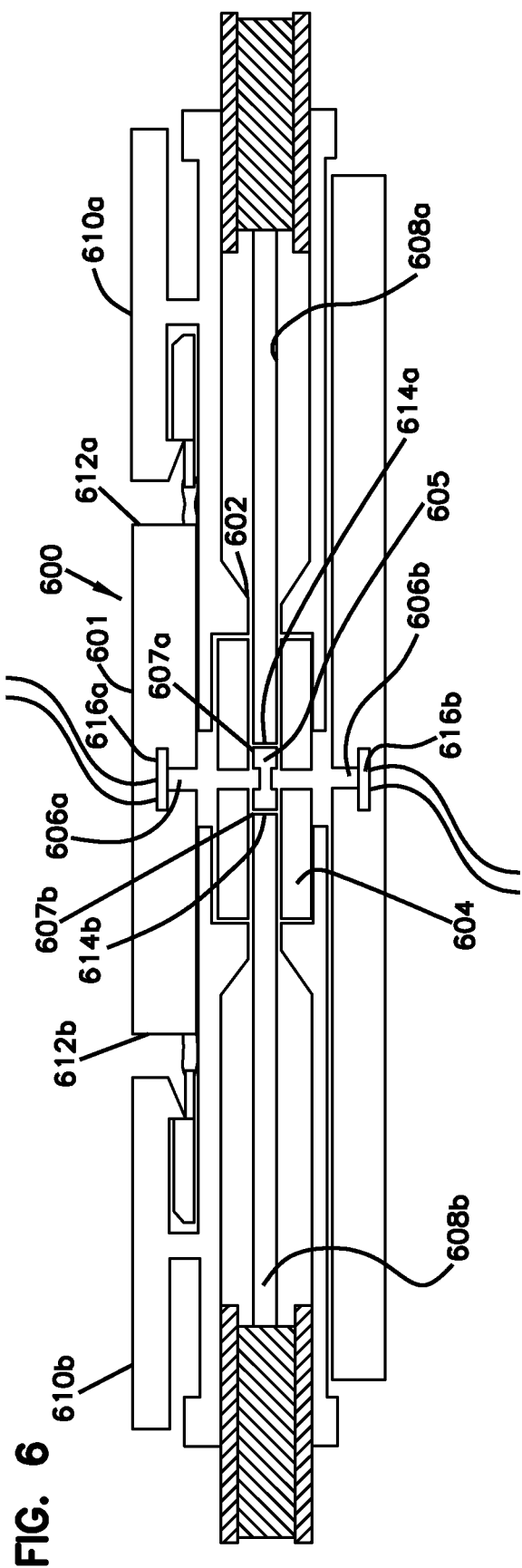
FIG. 6 is a cross-sectional view of an example of a ferrule-less optical fiber detection system utilizing an adapter.

FIG. 6 illustrates another example embodiment of a system and/or method for detecting an optical signal and/or optical power in a ferrule-less optical fiber. In this embodiment, the system includes an adapter 600 having an adapter body housing 601 that is configured with an alignment structure 602 having an alignment sleeve 604 and an independent bare fiber portion 605 located within the alignment sleeve 604. The independent bare fiber portion 605 comprises one or more lengths of bare optical fiber, e.g. core and cladding, which can be larger, smaller or of the same diameter as the ferrule-less optical fibers 608a, 608b. In the instance of two or more lengths of bare optical fiber, the lengths can be adhered, fused or otherwise bonded to one another to form the independent bare fiber portion 605.

First and second ends 607a, 607b of the independent bare fiber portion 605 are finished to enable an interface between the ends 607a, 607b and the ferrule-less optical fibers inserted into the alignment sleeve of the adapter 600. The adapter 600 further includes one or more light detection channels, e.g. channels 606a, 606b perpendicular to the axial direction of the alignment sleeve 604. The alignment sleeve 604 receives a first ferrule-less optical fiber 608a extending from a first connector 610a and a second ferrule-less optical fiber 608b extending from a second connector 610b. First and second ends, 612a and 612b, respectively are configured to interface with the first and second connectors 610a, 610b such that a tip 614a, 614b of each of the ferrule-less optical fibers 608a, 608b is positioned at a desired location within the adapter 600; in this instance, a location enabling abutment to the ends 607a, 607b of the independent bare fiber portion 605 located within the alignment sleeve 604. The abutment between first and second ends 607a, 607b and the tips 614a, 614b of the ferrule-less optical fibers 608a, 608b can occur in a butt joint configuration or in a configuration where the first and second end 607a, 607b and the tips 614a, 614b are angled at complementary angles.

In the example of FIG. 6, the independent bare fiber portion 605 includes one or more locations 615 where the cladding has been removed allowing a portion of the transmitted light to escape. The one or more cladding-absent locations 615 of the independent bare fiber portion 605 are positioned proximate the light detection channels 606a, 606b such that light traveling through the independent bare fiber portion 605 might also travel through the one or more light detection channels 606a, 606b. An optical detector 616a, 616b is positioned at the end of each light detection channel 606a, 606b to detect the light traveling there through and provide an indication of the detected light. The optical detectors 616a, 616b can be fixedly or removably mounted to the adapter 600 and can be powered internally, e.g. with a battery, or with an external power source. In certain embodiments, a refractive coating is provided over the cladding-absent locations 615 to enhance light transmission to the detectors 616a, 616b.

Figure 7:
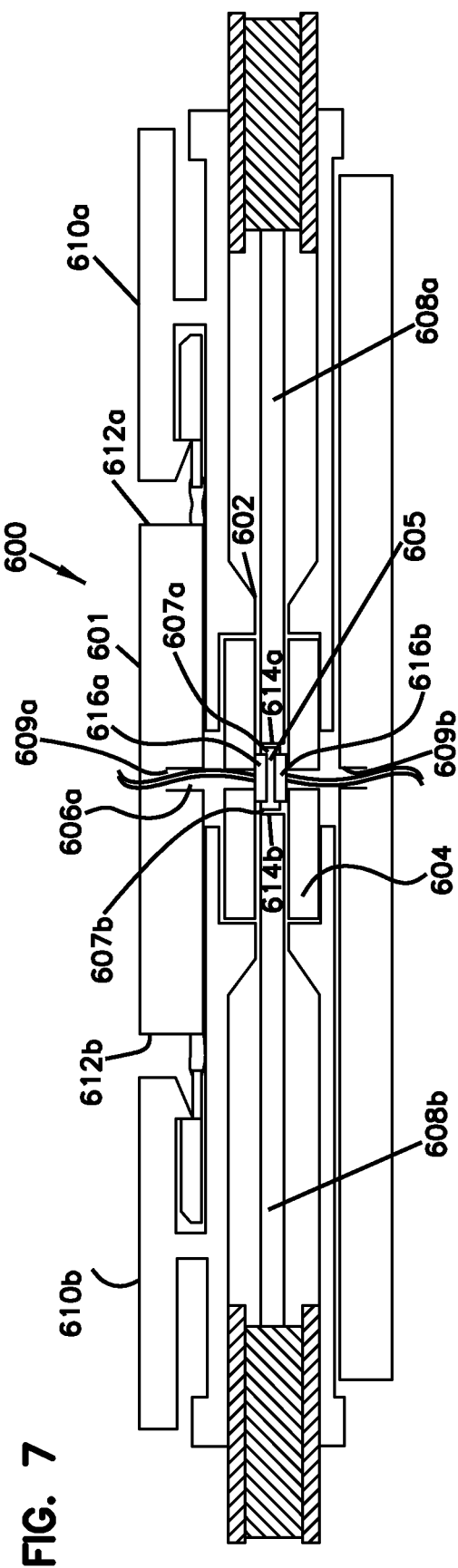
FIG. 7 is a cross-sectional view of an example of a ferrule-less optical fiber detection system utilizing an adapter.

In certain embodiments, see FIG. 7, the one or more optical detectors 616a, 616b are mounted directly onto the cladding-absent portions of the independent bare fiber portion 605 while wiring electrically coupled to the optical detectors 616a, 616b passes through one or more wiring channels 609a, 609b. In certain embodiments, the one or more optical detectors 616a, 616b are not mounted directly onto the cladding absent portions of the independent bare fiber portion 605 but are rather mounted on the alignment sleeve 604 in a position immediately proximate the cladding-absent portions of the independent bare fiber portion 605. Other mounting positions within or about the adapter 600 are also possible.

Figure 8B:
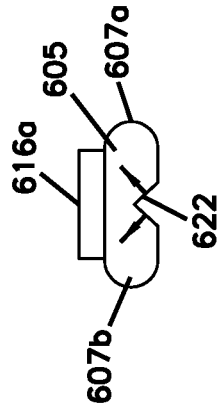
FIG. 8B illustrates an example embodiment of a bare fiber portion usable in the alignment sleeve of FIG. 8A.
Figure 8A:
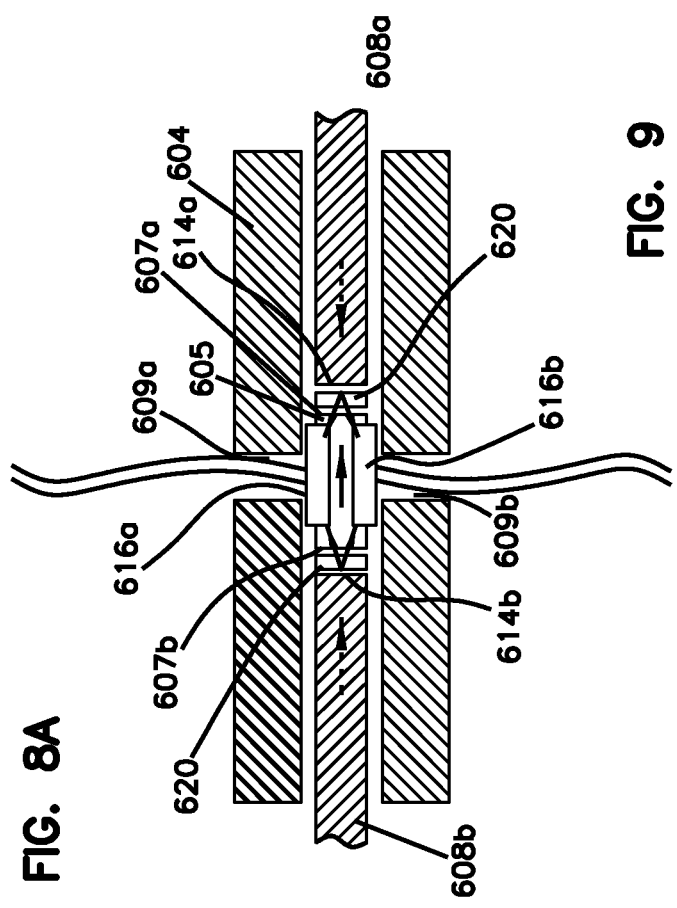
FIG. 8A is a cross-sectional view of an example of a ferrule-less optical fiber detection system illustrating an alignment sleeve of an adapter.

Referring now to FIG. 8A, where the alignment sleeve 604 of the adapter 600 is illustrated, a collimating lens 620 is provided intermediate the tips 614a, 614b of the optical fibers 608a, 608b and the first and second ends 607a, 607b of the independent bare fiber portion 605. The collimating lenses 620 split the light transmitted by the optical fibers 608a, 608b into parallel rays that can be detected by the optical detectors 616a, 616b. In certain embodiments, referring to FIG. 8b, one or both of the first and second ends 607a, 607b of the independent bare fiber portion 605 can have a collimated lens shape alternatively or in addition to the collimating lenses 620. In certain embodiments, the collimating lenses 620 are eliminated leaving only the first and second ends 607a, 607b of the independent bare fiber portion 605 with a collimated configuration. In certain embodiments, the independent bare fiber portion 605 is replaced or enhanced with a density filter to help direct the light being transmitted there through to the optical detectors 616a, 616b. In certain embodiments, the independent bare fiber portion 605 includes: a lens, mirror, grating, prism, bend, notch 622 (see FIG. 8B), distortion point, or other feature that can assist in directing light onto the detectors 616a, 616b.

Figure 9:
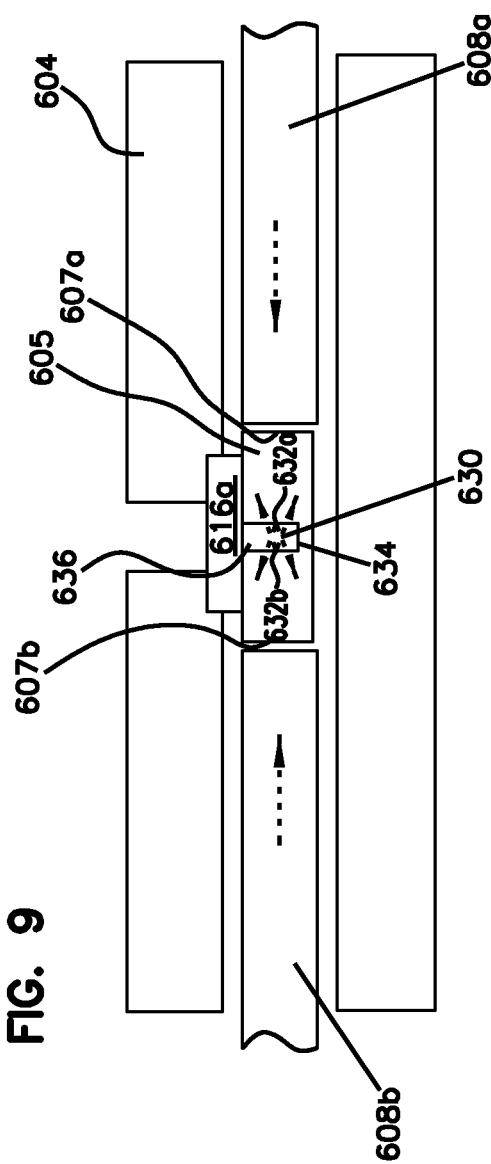
FIG. 9 is a cross-sectional view of an example of a ferrule-less optical fiber detection system illustrating an alignment sleeve of an adapter.

Referring to FIG. 9, in certain embodiments, the independent bare fiber portion 605 includes a channel 630 that is perpendicular to the axial direction of the independent bare fiber portion 605. The channel 630 is defined by a first side 632a and a second side 632b, an enclosed lower side 634 and an upper opening 636. In the embodiment of FIG. 9, a single optical detector 616a that is placed over the upper opening 636 of the channel 630 is illustrated, however, all of the embodiments described herein can be modified to include one or more optical detectors. The sides 632a, 632b, 634 provide a surface against which light transmitted through the first and second optical fibers 608a, 608b can be reflected and directed towards the detector 616a. In certain embodiments, the channel 630 is filled with a scattering medium to help direct light to the detector 616a. In certain embodiments, a lens is placed in the channel to help direct light to the detector 616a. In certain embodiment, one or more of the first, second and lower sides 632a, 632b, 634 are modified from a smooth surface to a textured surface with gratings or undulations on the surface that help to direct light to the detector 616a.

Referring to FIG. 10, in certain embodiments, the tips 614a, 614b of the ferrule-less optical fibers 608a, 608b are polished to present an angled end surface 640a, 640b such that when the tips 614a, 614b interface with the independent bare fiber portion 605 a gap 642 is present between the a portion of the end surface 640a, 640b and respective ends 607a, 607b of the independent bare fiber portion 605. The optical detectors 616a, 616b are placed proximate the gap 642 or other appropriate location in or about the adapter 600.

Referring to FIG. 11, in certain embodiments the tips 614a, 614b of the ferrule-less optical fibers 608a, 608b are polished to present a rounded end surface 644a, 644b such that when the tips 614a, 614b interface with the independent bare fiber portion 605 a spacing 646 about the rounded end surfaces 644a, 644b is established proximate the independent bare fiber portion 605. Optical detectors 616a, 616b are placed proximate a portion of the spacing 646 or at another appropriate location within or about the adapter 600.

Referring to FIG. 12, in certain embodiments a guide or pin 648 deflects a portion of the ferrule-less optical fibers 608a, 608b toward the optical detectors 616a, 616b such that light being emitted from a cladding free section 649 of the ferrule-less optical fibers 608a, 608b can be detected by the optical detectors 616a, 616b.

Referring to FIGS. 13A-13B, in certain embodiments the core 650 of the independent bare fiber portion 605 is provided with a distortion point 652 (or gratings/undulations 654, respectively, to help direct light to the detectors 616a, 616b; FIGS. 13A-13B also illustrate that a portion of the cladding 656 has been removed to enable the optical detectors 616a, 616b to detect an optical signal being transmitted through the independent bare fiber portion 605.

Figure 14A:
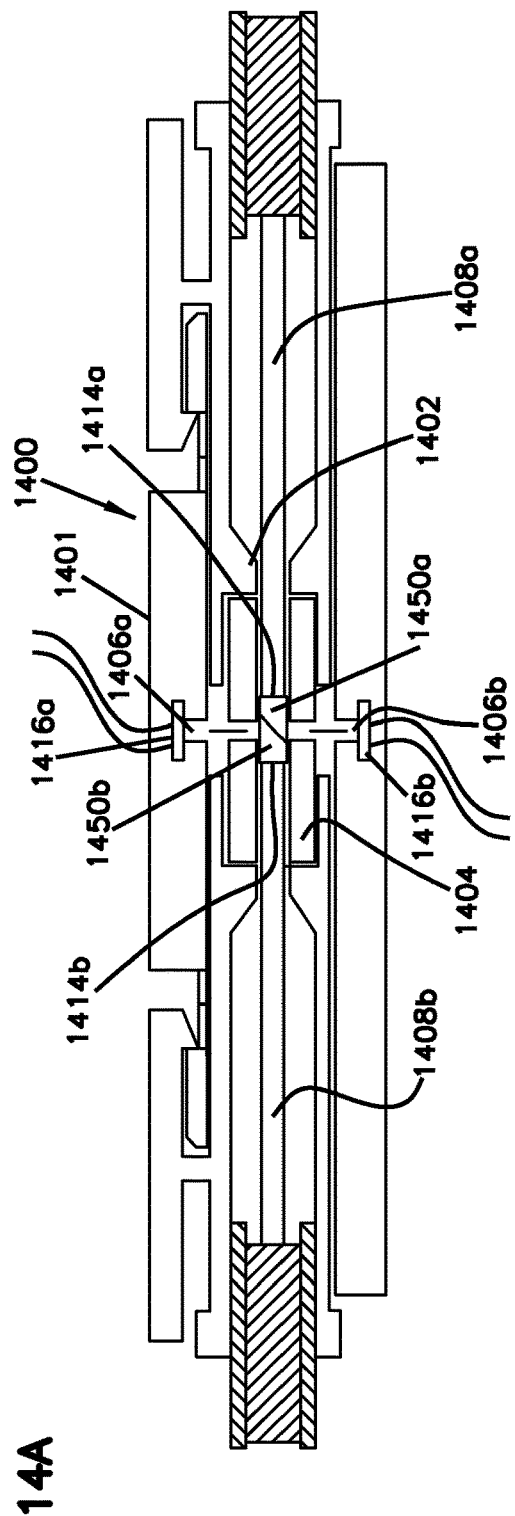
FIGS. 14A and 14B provide a cross-sectional view of an example of a ferrule-less optical fiber detection system illustrating an alignment sleeve of an adapter and an exploded view of the interfacing GRIN lenses of FIG. 14A, respectively.
Figure 14B:
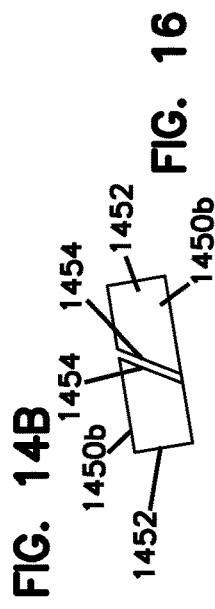

FIGS. 14A-14B illustrates another example embodiment of a system and/or method for detecting an optical signal and/or optical power in a ferrule-less optical fiber. In this embodiment, the system includes an adapter 1400. The adapter 1400 includes an adapter body housing 1401 that is configured with an alignment structure 1402 having an alignment sleeve 1404. First and second gradient index (GRIN) lenses 1450a, 1450b are located within the alignment sleeve 1404. The GRIN lenses 1450a, 1450b, can be of a larger, smaller or the same diameter as ferrule-less optical fibers 1408a, 1408b.

Each of the GRIN lenses 1450a, 1450b includes a first end 1452 and a second end 1454. The first end 1452 of each of the GRIN lenses 1450a, 1450b is cut, polished and/or otherwise configured to interface with first and second ferrule-less optical fibers 1408a, 1408b. The second ends 1454 of the GRIN lenses 1450a, 1450b are configured to abut one another at a 45 degree angle, or other appropriate angle. In certain embodiments the second ends 1454 of the GRIN lenses 1450a, 1450b are bonded to each other, for example, by adhesive, fusion welding, or other appropriate bonding procedure. The bonded GRIN lenses 1450a, 1450b are secured within the alignment sleeve 1404 intermediate sleeve portions 1454a, 1454b that are configured to receive tips 1414a, 1414b of the ferrule-less optical fibers 1408a, 1408b.

In certain embodiments, the amount of reflection of the GRIN lenses 1450a, 1450b is controlled by coating all or a portion of the GRIN lenses with a reflective coating of a desired index of refraction and/or by an adhesive having a desired index of refraction that is used in securing the GRIN lenses 1450a, 1450b to one another and/or to the alignment sleeve 1404. In certain embodiments, the GRIN lenses 1450a, 1450b are quarter-pitch GRIN lenses that expand and collimate the light being transmitted there through; in the collimate region, a reflective element (e.g. coating or adhesive with desired index of refraction) reflects a portion of the light away from the optical axis of the ferrule-less optical fibers 1408a, 1408b.

In certain embodiments, the adapter 1400 further includes one or more light detection channels, e.g. channels 1406a, 1406b perpendicular to the axial direction of the alignment sleeve 1404. A optical detector 1416a, 1416b is positioned at the end of each light detection channel 1406a, 1406b to detect the light reflected by the GRIN lenses 1450a, 1450b, respectively, and provide an indication of the detected light. The optical detectors 1416a, 1416b can be fixedly or removably mounted to the adapter 1400 and can be powered internally, e.g. with a battery, or with an external power source. In certain embodiments, the optical detectors 1416a, 1416b are placed immediately proximate the GRIN lenses 1450a, 1450b or at an intermediate distance within the optical detector channel 1406a, 1406b.

Figure 15:
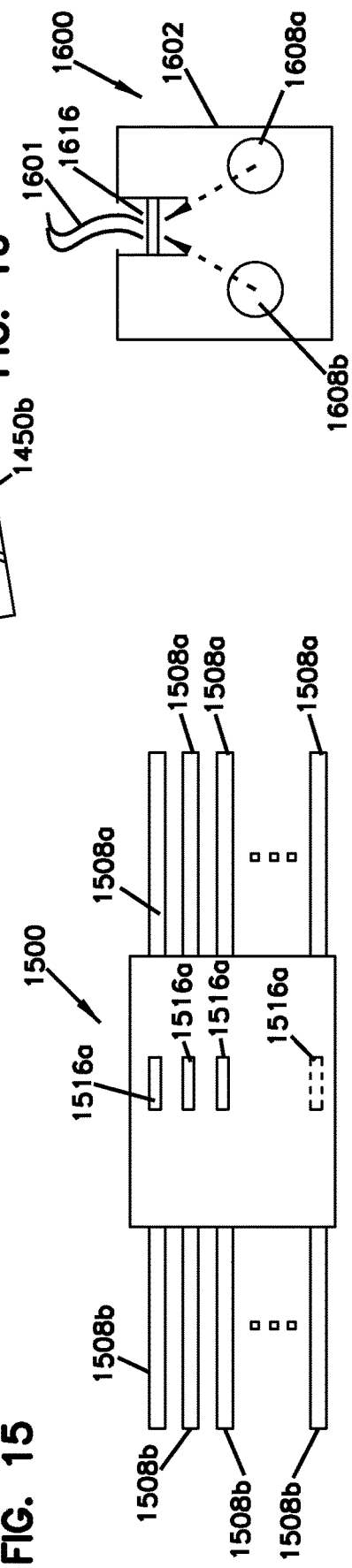
FIG. 15 is a top view of an example of a ferrule-less optical fiber detector system.

FIG. 15 illustrates another example embodiment of a system and/or method for detecting an optical signal and/or optical power in a ferrule-less optical fiber. In the embodiment of FIG. 15, the system includes multi-fiber adapter 1500. The adapter 1500 includes a body portion 1502 configured to receive at least two ferrule-less optical fibers 1508a and/or at least two ferrule-less optical fibers 1508b. In certain embodiments, the adapter 1500 includes an optical detector 1516a for each of the ferrule-less optical fibers 1508a and/or for each of the ferrule-less optical fibers 1508b. The optical detector 1516a are placed in a location wherein detection of light escaping from one or more of the ferrule-less optical fibers 1508a, 1508b is possible including within or an a surface of the adapter 1500. In the instance that more than one optical detector is used for each pairing of ferrule-less optical fibers (pair=e.g. 1508a, 1508b), the multiple optical detectors can be place side-by-side, opposite one another (e.g., 180 deg.), at right angles one another (e.g., 90 deg.) or at other desired positions relative to one another. In certain embodiments, the optical detector 1516a is visible when observing the adapter 1500 while in other embodiments the optical detector 1516a is embedded or otherwise non-visible when observing the adapter. FIG. 15 also illustrates that any of the adapters described herein can be configured to interface with a non-connectorized ferrule-less optical fiber. Additional information about adapters for non-connectorized ferrule-less optical fibers can be found in U.S. Provisional Application No. 62/354,480, filed Jun. 24, 2016 and entitled "Elastomeric Optical Fiber Alignment and Coupling Device." The entire contents of the noted provisional application is hereby incorporated by reference.

Figure 16:
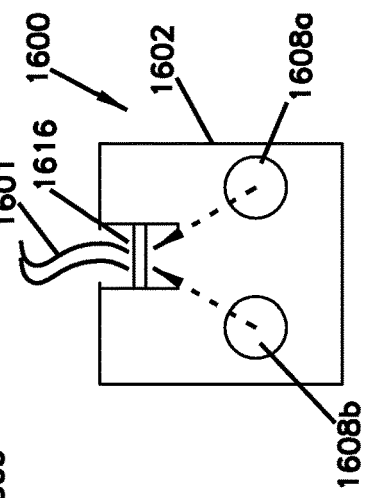
FIG. 16 a cross-sectional view of an example of a ferrule-less optical fiber detection system.

FIG. 16 illustrates a cross-section view of an example embodiment of a ferrule-less multi fiber adapter 1600. The adapter 1600 includes a body portion 1602 configured to receive two side-by-side ferrule-less optical fibers 1608a, 1608b. A single optical detector 1616, with wiring 1601, is positioned in a light detection channel 1606 and detects light from both of ferrule-less optical fibers 1608a, 1608b.

Figure 17:
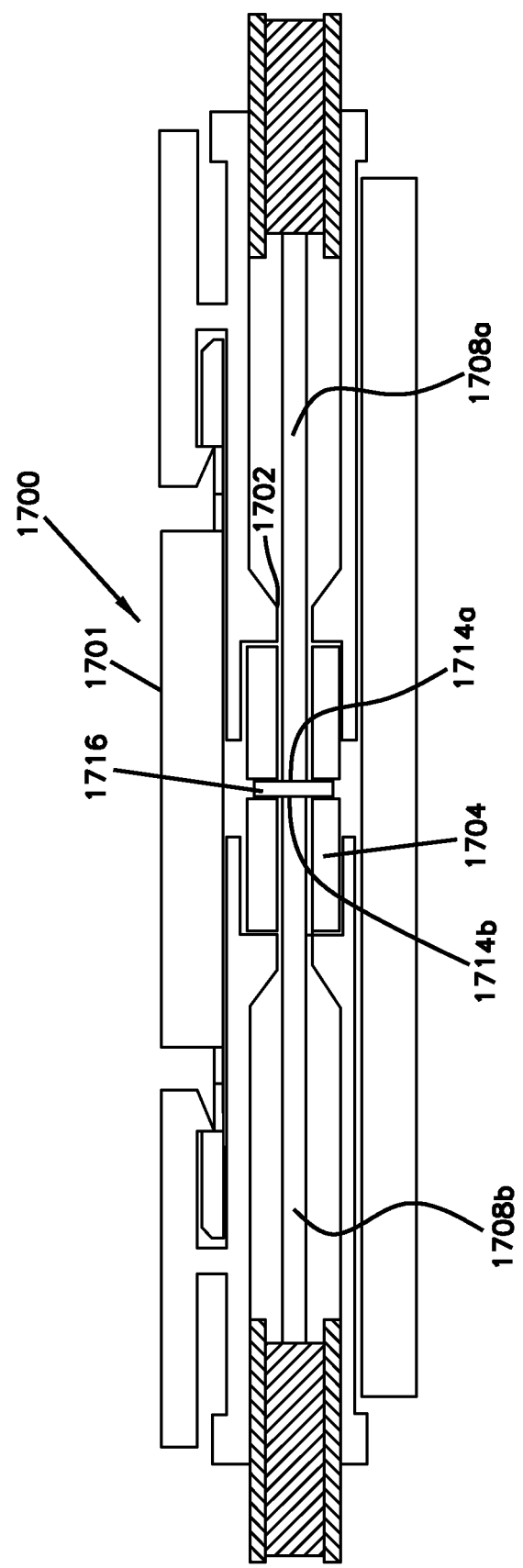
FIG. 17 a cross-sectional view of an example of a ferrule-less optical fiber detection system.

FIG. 17 illustrates another example embodiment of a system and/or method for detecting an optical signal and/or optical power in a ferrule-less optical fiber. In this embodiment, the system includes an adapter 1700 having an adapter body housing 1701 that is configured with an alignment structure 1702 having an alignment sleeve 1704 and an optical detector 1716 positioned within the alignment sleeve 1704. Tips 1714a, 1714b of respective optical fibers 1708a, 1708b abut the optical detector 1716 enabling the optical detector to detect the light exiting the optical fibers 1708a, 1708b. In certain embodiments, a single optical detector 1716 has an optical detection panel on each side while in other embodiments two optical detectors 1716, each with an optical detection panel facing its respective optical fiber, are used to detect the exiting light of the fibers 1708a, 1708b.

It will be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed:

1. An optical signal detection system, comprising:
   a housing having a first end and a second end, wherein the first end receives a ferrule-less optical fiber; and
   an optical detector mounted within the housing, wherein the optical detector detects at least a portion of an optical signal transmitted through the ferrule-less optical fiber and generates an output representative of the detected optical signal.

2. The optical signal detection system of claim 1, further comprising a power supply to power the optical detector.

3. The optical signal detection system of claim 2, wherein the power supply is external to the housing.

4. The optical signal detection system of claim 2, wherein the power supply is within the housing.

5. The optical signal detection system of claim 1, further comprising a light directing feature within the housing to direct at least a portion of the optical signal transmitted through the ferrule-less optical fiber to the optical detector.

6. The optical signal detection system of claim 5, wherein the light directing feature includes a lens, a mirror, a grating, a prism, a light reflecting gel or liquid, a light directing channel, or a bare optical fiber.

7. The optical signal detection system of claim 6, wherein the bare optical fiber includes a groove, a notch, a lens, a mirror, a grating, a prism, a distortion point, a reflective coating or a cladding-free portion to direct the portion of the optical signal to the optical detector.

8. The optical signal detection system of claim 6, wherein an open space at the interface of the bare optical fiber and the ferrule-less optical fiber enables detection of the portion of the optical signal transmitted through the ferrule-less optical fiber by the optical detector.

9. The optical signal detection system of claim 1, wherein the ferrule-less optical fiber includes a groove, a notch, a lens, a mirror, a grating, a prism, a distortion point, or a cladding-free portion to direct a portion of the optical signal transmitted through the ferrule-less optical fiber to the optical detector.

10. An optical signal detection system, comprising:
    a housing having a first end and a second end, wherein the first end receives a first ferrule-less optical fiber and wherein the second end receives a second ferrule-less optical fiber;
    a first optical detector mounted within the housing, wherein the first optical detector detects an optical signal transmitted through the first ferrule-less optical fiber and generates a first output representative of the detected optical signal; and
    a second optical detector mounted within the housing, wherein the second optical detector detects an optical signal transmitted through the second ferrule-less optical fiber and generates a second output representative of the detected optical signal.

11. The optical signal detection system of claim 10, further comprising a power supply to power the first and second optical detectors.

12. The optical signal detection system of claim 11, wherein the power supply is external to the housing.

13. The optical signal detection system of claim 11, wherein the power supply is within the housing.

14. The optical signal detection system of claim 10, further comprising a light directing feature within the housing to direct at least a portion of the optical signal transmitted through the first and second ferrule-less optical fibers to the first and second optical detectors, respectively.

15. The optical signal detection system of claim 14, wherein the light directing feature includes a lens, a mirror, a grating, a prism, a light reflecting gel or liquid, a light directing channel, or a bare optical fiber.

16. The optical signal detection system of claim 15, wherein the bare optical fiber includes a groove, a notch, a lens, a mirror, a grating, a prism, a distortion point, a reflective coating or a cladding-free portion to direct the portion of the optical signal to the first and second optical detectors.

17. The optical signal detection system of claim 15, wherein an open space at the interface of the bare optical fiber with the first and second ferrule-less optical fibers enables detection of the portion of the optical signal transmitted through the first and second ferrule-less optical fibers by the first and second optical detectors, respectively.

18. The optical signal detection system of claim 10, wherein the first and/or the second ferrule-less optical fiber includes a groove, a notch, a lens, a mirror, a grating, a prism, a distortion point, or a cladding-free portion to direct a portion of the optical signal transmitted through the ferrule-less optical fiber to the first and second optical detectors, respectively.

19. The optical signal detection system of claim 10, wherein the housing is configured to optically couple the first and second ferrule-less optical fibers.

20. The optical signal detection system of claim 10, wherein the housing is configured to interface with first and second connectors, the first and second connectors connectorizing the first and second ferrule-less optical fibers, respectively.

21. A method of detecting an optical signal:
    receiving into a housing first and second ferrule-less optical fibers;
    directing at least a portion of a first optical signal transmitted through the first ferrule-less optical fiber to a first optical detector and directing at least a portion of a second optical signal to a second optical detector, the first and second optical detectors mounted within the housing;
    detecting with the first and second optical detectors the optical signal directed towards the respective first and second optical detectors; and
    generating with each of the first and second optical detectors an output representative of the optical signal detected by the first and second optical detectors, respectively.

* * * * *